US008677150B2

(12) United States Patent
Wang et al.

(10) Patent No.: US 8,677,150 B2
(45) Date of Patent: Mar. 18, 2014

(54) LOW-POWER MULTI-STANDARD CRYPTOGRAPHY PROCESSING UNITS WITH COMMON FLIP-FLOP/REGISTER BANKS

(75) Inventors: Andrew A. Wang, Wescosville, PA (US); Ravi Jammula, King of Prussia, PA (US); Lothar Winkler, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1 day.

(21) Appl. No.: 13/363,532

(22) Filed: Feb. 1, 2012

(65) Prior Publication Data
US 2013/0198530 A1 Aug. 1, 2013

(51) Int. Cl.
*G06F 15/16* (2006.01)
(52) U.S. Cl.
USPC .......................... 713/190; 713/310; 713/320
(58) Field of Classification Search
USPC .................... 713/190–194, 310, 320–324
See application file for complete search history.

(56) References Cited

U.S. PATENT DOCUMENTS

| | | | |
|---|---|---|---|
| 6,510,228 B2 | 1/2003 | Rose | |
| 7,620,821 B1 * | 11/2009 | Grohoski et al. | 713/189 |
| 7,688,972 B2 | 3/2010 | Suen et al. | |
| 7,900,022 B2 | 3/2011 | Feghali et al. | |
| 7,956,639 B2 * | 6/2011 | Pavicic et al. | 326/38 |
| 8,209,492 B2 * | 6/2012 | Howlett et al. | 711/147 |
| 2006/0282623 A1 * | 12/2006 | Howlett et al. | 711/147 |
| 2007/0168828 A1 * | 7/2007 | Doring | 714/752 |
| 2007/0294517 A1 * | 12/2007 | Ayrignac et al. | 712/228 |
| 2008/0013715 A1 * | 1/2008 | Feghali et al. | 380/28 |
| 2008/0075278 A1 | 3/2008 | Gaubatz et al. | |
| 2008/0140871 A1 * | 6/2008 | Park et al. | 710/14 |
| 2009/0240754 A1 * | 9/2009 | Huang | 708/308 |
| 2010/0106989 A1 * | 4/2010 | Chen | 713/322 |
| 2010/0110085 A1 * | 5/2010 | Samuel et al. | 345/519 |
| 2010/0142702 A1 | 6/2010 | Wolf et al. | |
| 2011/0001512 A1 * | 1/2011 | Pavicic et al. | 326/41 |

FOREIGN PATENT DOCUMENTS

EP 0447244 A2 9/1991
WO 2007078923 A2 7/2007

* cited by examiner

*Primary Examiner* — Haresh N Patel

(57) ABSTRACT

A method, system, and apparatus for managing a plurality of cipher processor units. A cipher module may receive a cipher instruction indicating a cipher algorithm to be used. The cipher module may identify a cipher processing unit of the plurality of cipher processing units associated with the cipher algorithm. The cipher module may execute the cipher instruction using the cipher processing unit and the common register array. The cipher module may store a state of a common register array to be used by the cipher processing unit of the plurality of cipher processing units.

16 Claims, 6 Drawing Sheets

LOW-POWER MULTI-STANDARD CRYPTOGRAPHY PROCESSING UNITS WITH COMMON FLIP-FLOP/REGISTER BANKS

TECHNICAL FIELD

Aspects of this disclosure relate generally to cipher processing units. In particular, an aspect of this disclosure relates to managing cipher processing units and common register arrays.

BACKGROUND

Today a vast spectrum of different telecommunication systems has evolved for both wired and wireless telecommunication. Telecommunication systems have been standardized in connection with second generation (2G) and third generation (3G) mobile phone systems. Information about 3G-technology (e.g. W-CDMA or CDMA2000) and 2G-technology (e.g. GSM). Fourth generation (4G) systems exist for enabling even higher data transfer speeds. One such example is LTE (Long Term Evolution), which is the next step in terms of user-service experience, improving latency, capacity and throughput. For example, this includes the 3GPP work on the Evolution of the 3G Mobile Systems and hence the evolution of the Universal Terrestrial Radio Access Network (UTRAN).

Cryptography can protect data from unwanted access during wireless communications. Cryptography typically involves mathematical operations on data (encryption) that makes the original data (plaintext) unintelligible (ciphertext). Reverse mathematical operations (decryption) restore the original data from the ciphertext. Typically, decryption relies on additional data such as a cryptographic key. A cryptographic key is data that controls how a cryptography algorithm processes the plaintext. In other words, different keys generally cause the same algorithm to output different ciphertext for the same plaintext. Absent a needed decryption key, restoring the original data is, at best, an extremely time consuming mathematical challenge.

Cryptography is used in a variety of situations. For example, a document on a computer may be encrypted so that only authorized users of the document can decrypt and access the contents of the documents. Similarly, cryptography is often used to encrypt the contents of packets traveling across a public network. While malicious users may intercept these packets, these malicious users access only the ciphertext rather than the plaintext being protected.

Cryptography covers a wide variety of applications beyond encrypting and decrypting data. For example, cryptography is often used in authentication (i.e., reliably determining the identity of a communicating agent), the generation of digital signatures, and so forth.

Current cryptographic techniques rely heavily on intensive mathematical operations. For example, many schemes involve the multiplication of very large numbers. For instance, many schemes use a type of modular arithmetic known as modular exponentiation which involves raising a large number to some power and reducing it with respect to a modulus (i.e., the remainder when divided by given modulus). The mathematical operations required by cryptographic schemes can consume considerable processor resources. For example, a processor of a networked computer participating in a secure connection may devote a significant portion of its computation power on encryption and decryption tasks, leaving less processor resources for other operations.

Therefore, it would be advantageous to have a method, system, and computer program product that addresses one or more of the issues discussed above.

SUMMARY

In an aspect of this disclosure, a method for managing a plurality of processor unit may comprise receiving an instruction indicating an algorithm to be used; identifying a processing unit of the plurality of processing units associated with the algorithm; executing the instruction using the processing unit and a common register array; and storing a state of the common register array used by the processing unit of the plurality of processing units.

In an aspect of this disclosure, a system for performing cryptographic tasks may comprise a memory unit; and a cipher module connected to the memory unit through the bus and configured to perform the cryptographic task, wherein the cipher module comprises: a plurality of cipher processing units configured to execute a cipher instruction; and a number of common register arrays associated with the plurality of cipher processing units, wherein each register array of the number of common register arrays is accessed by only one cipher processing unit at a time, and wherein a state of each of the number of common register arrays is configured to be stored into the memory unit by the cipher module.

In an aspect of this disclosure, an apparatus may comprise a bus; a memory unit; a number of common register arrays connected to the memory unit through the bus; and a plurality of cipher processing units connected to the number of common register arrays, wherein each of the plurality of cipher processing units is connected to each of the number of common register arrays, and wherein each cipher processing unit is configured to execute a cipher algorithm of a plurality of cipher algorithms.

BRIEF DESCRIPTION OF DRAWINGS

In the drawings, like reference characters generally refer to the same parts throughout the different views. The drawings are not necessarily to scale. In the following description, aspects of this disclosure are described with reference to the following drawings, in which.

DETAILED DESCRIPTION

The following detailed description refers to the accompanying drawings that show, by way of illustration, specific details and aspects of this disclosure. The word "exemplary" is used herein to mean "serving as an example, instance, or illustration". Any aspect of this disclosure or design described herein as "exemplary" is not necessarily to be construed as preferred or advantageous over other aspects of this disclosure or designs.

Figure 1:
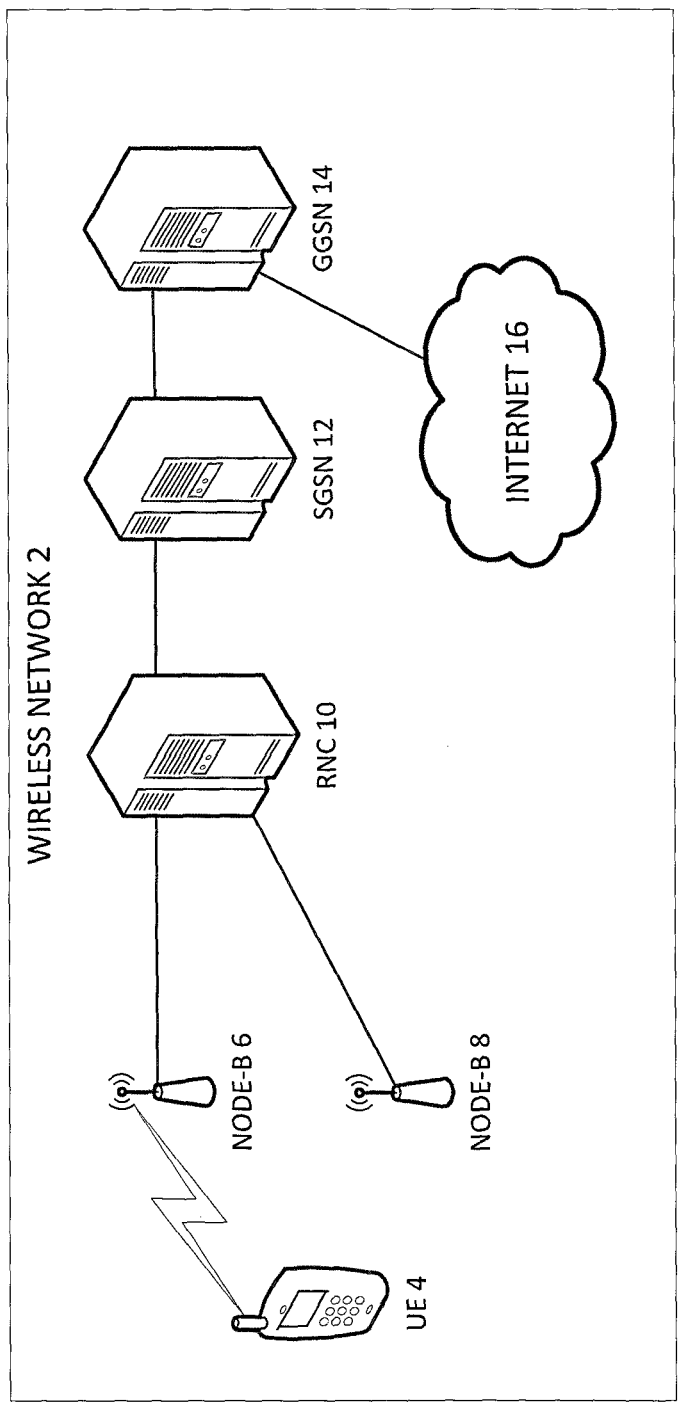
FIG. 1 is an illustration of a wireless network in accordance with an aspect of this disclosure.

FIG. 1 is an illustration of a wireless network in accordance with an aspect of this disclosure. In an aspect of this disclosure, wireless network 2 may be a network implemented with radio signals. In different aspects, various components of wireless network 2 may use wired connections as well as wireless connections. Wireless network 2 may be a wireless wide area network (WWAN). The WWAN may use mobile telecommunication cellular network technologies such as Long Term Evolution (LTE), LTE-Advanced, WiMAX (often called a wireless metropolitan area network or WMAN), UMTS, CDMA2000, GSM, cellular digital packet data (CDPD) and Mobitex to transfer data.

In an aspect of this disclosure, wireless network 2 may include user equipment (UE) 4, Node-B 4, Node-B 8, Radio Network Controller (RNC) 10, Serving General Packet Radio Service Support Node (SGSN) 12, Gateway General Packet Radio Service Support Node (GGSN) 14, and Internet 16. UE 4 transmits and receives information through Node-Bs 6 and 8. In turn, Node-B's forward information to and from RNC 10. RNC 10 communicates with SGSN 12 which communicates with GGSN 14. Finally, GGSN 14 is communicates between SGSN 12 and Internet 16.

Furthermore, in an aspect of this disclosure, Node-B's 6 and 8 and RNC 10 may be part of UMTS Terrestrial Radio Access Network (UTRAN). Additionally, SGSN 12 and GGSN 14 may be part of the Core Network (CN).

In an aspect of this disclosure, UE 4 may be a mobile handsets carried by end users. The UTRAN allows connectivity between a UE and the CN. The CN may consist of two components: base stations, called Node-Bs, and Radio Network Controllers (RNC), which control multiple Node-Bs. UTRAN features such as packet scheduling, radio resource control, and handover control may be implemented at RNC 10. The CN operates, in particular GGSN 14, to serve as a gateway hiding UMTS internal infrastructures from the external network, such as Internet 16.

In an aspect of this disclosure, Node-Bs 6 and 8 may be, as used in UMTS, equivalent to the base transceiver station (BTS) description used in the Global System for Mobile Communications (GSM). In contrast with GSM base stations, Node-Bs 6 and 8 may use Wideband Code Division Multiple Access or Time Division Synchronous Code Division Multiple Access (WCDMA/TD-SCDMA) as an air interface technology. As in all cellular systems, such as UMTS and GSM, the Node-Bs 6 and 8 have radio frequency transmitters and receivers used to communicate directly with mobile devices.

In an aspect of this disclosure, RNC 10 is a governing element in a UMTS radio access network and is responsible for controlling Node Bs 6 and 8 that are connected to it. RNC 10 carries out radio resource management, some of the mobility management functions, and is the point where encryption is done before user data is sent to and from the mobile.

Data transmitted throughout wireless network 2 may be encrypted in different portions of wireless network 2. The data may be encrypted so that only authorized recipients of the transmission can decrypt and access the contents of the transmission.

The illustration of wireless network 2 in FIG. 1 is not meant to imply physical or architectural limitations to the manner in which an aspect of this disclosure may be implemented. Other components in addition and/or in place of the ones illustrated may be used. Some components may be unnecessary in an aspect of this disclosure.

Figure 2:
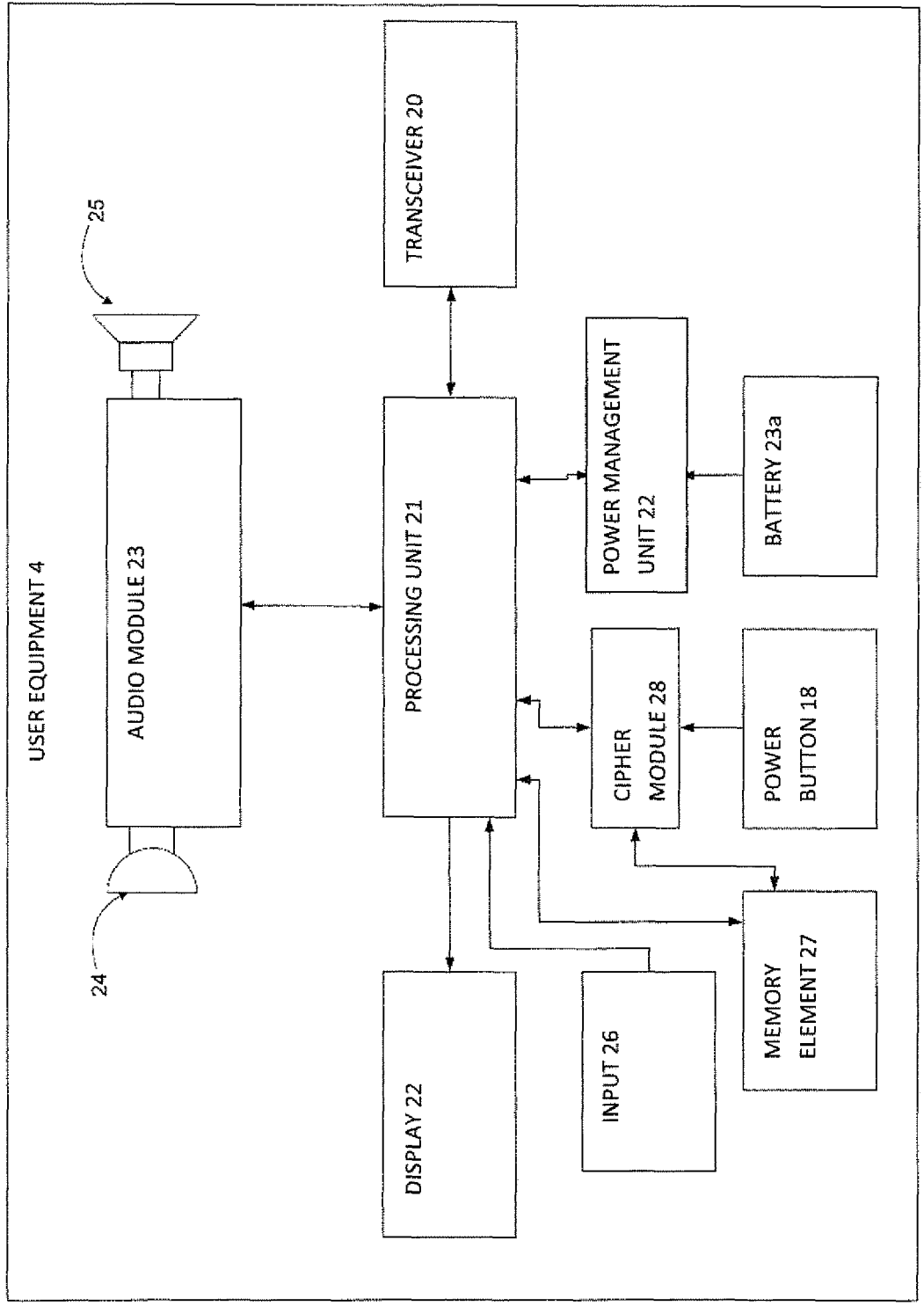
FIG. 2 is an illustration of user equipment in accordance with an aspect of this disclosure.

FIG. 2 is an illustration of user equipment in accordance with an aspect of this disclosure. In an aspect of this disclosure, user equipment 4 operates as a transmitter and a receiver of wireless communications signals. Specifically, in one example, user equipment 4 may be capable of both transmitting and receiving "3G" mobile services. As mentioned above, these "3G" services include those referred to in connection with specifications and standards promulgated by The 3rd Generation Partnership Project ("3GPP"), which is an initiative of the European Telecommunications Standards Institute ("ETSI"). As known in the art, "3G" services include such functionality as full Internet access, downloadable and streaming video content, as well as high-fidelity voice telephone communications. In another example, user equipment 4 may be capable of transmitting and receiving "4G" mobile services as well, or any other mobile service.

User equipment 4 may correspond to a conventional wireless or cellular portable telephone, for example such a handset that is capable of receiving "3G", or "third generation" cellular services. Examples of devices that can correspond to user equipment 4 include cellular telephone handsets and "smartphones", such as those capable of Internet access, email and instant messaging communications, and portable video receiving and display device, along with the capability of supporting telephone services and the like. It is contemplated that those skilled in the art having reference to this specification will readily comprehend the nature of modern smartphone and telephone handset devices and systems suitable for implementation of the different aspects of this disclosure as described herein. As such, the architecture of user equipment 4 illustrated in FIG. 2 is presented at a relatively high level; even so, it is contemplated that modifications and alternatives to this architecture may be made and will be apparent to the reader, such modifications and alternatives contemplated to be within the scope of this description.

In an aspect of this disclosure, user equipment 4 includes transceiver 20, which is connected to and in communication with an antenna. Transceiver 20 may be a radio frequency transceiver. Also, transceiver 20 may be the way that wireless signals are transmitted and received. Transceiver 20 may constructed, for example, including analog and digital RF "front end" functionality, circuitry for converting RF signals to a baseband frequency, via an intermediate frequency (IF) if desired, analog and digital filtering, and other conventional circuitry useful for carrying out wireless communications over modern cellular frequencies, particularly those suited for 3G or 4G communications. Transceiver 20 is connected to processing unit 21, which performs the bulk of the digital signal processing of signals to be communicated and signals received, at the baseband frequency. One such function of processing unit 21 is to provide a graphics interface to display 22, for the display of text, graphics, and video to the user.

In an aspect of this disclosure, processing unit 21 may be a processor, multi-core processor, single core process, micro controller, controller circuit, or any other type of processing device. A processing unit can execute any type of instructions associated with the data to achieve the operations detailed herein. In one aspect of this disclosure, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In an aspect of this disclosure, processing unit 21 may also be coupled to power management unit 22. Power management unit 22 manages the power for user equipment 4, for example including the appropriate voltage regulator and other functions, coupled to battery 23a, an AC adaptor, DC adapter, or other types of power sources. Power management unit 22 may adjust power regulation throughout user equipment 4 in response to power button 18 being pressed. Power management unit 22 may intelligently manage the use of power by the various functions within user equipment 4.

In an aspect of this disclosure, processing unit 21 may also be coupled to audio module 23. Audio module 23 may include the codec functions for receiving and converting input audio signals, received by microphone 24 and for converting and driving audio output, via speaker 25. Input 26 of user equipment 4 may also be managed by processing unit 20. Input 26 may be a keypad or keyboard. Input 26 may be part of display 22 or physical and independent of display 22.

In an aspect of this disclosure, processing unit 21 may include a digital signal processor (DSP) subsystem. The DSP subsystem carries out functions involved in baseband processing of the data signals to be transmitted over the wireless communications ink, and of the data signals received over that link. In that regard, this baseband processing includes encoding and decoding of the data according to an error correction code, and also digital modulation and demodulation for transmission of the encoded data, in the well-known manner for orthogonal frequency division multiplexing (OFDM) or other modulation schemes, according to the particular protocol of the communications being carried out.

In an aspect of this disclosure, processing unit 21 may also be coupled to one or more memory elements (e.g., memory element 27) for storing information to be used in achieving operations associated with applications management, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory or storage items discussed herein should be construed as being encompassed within the broad term 'memory element' as used herein in this Specification.

In an aspect of this disclosure, processing unit 21 may also be coupled to cipher module 28. Cipher module 28 may be configured to perform cryptographic operations. Cipher module 28 may apply different cryptographic algorithms to bit streams or data streams. Cipher module 28 may also be coupled to memory elements 27.

Figure 3:
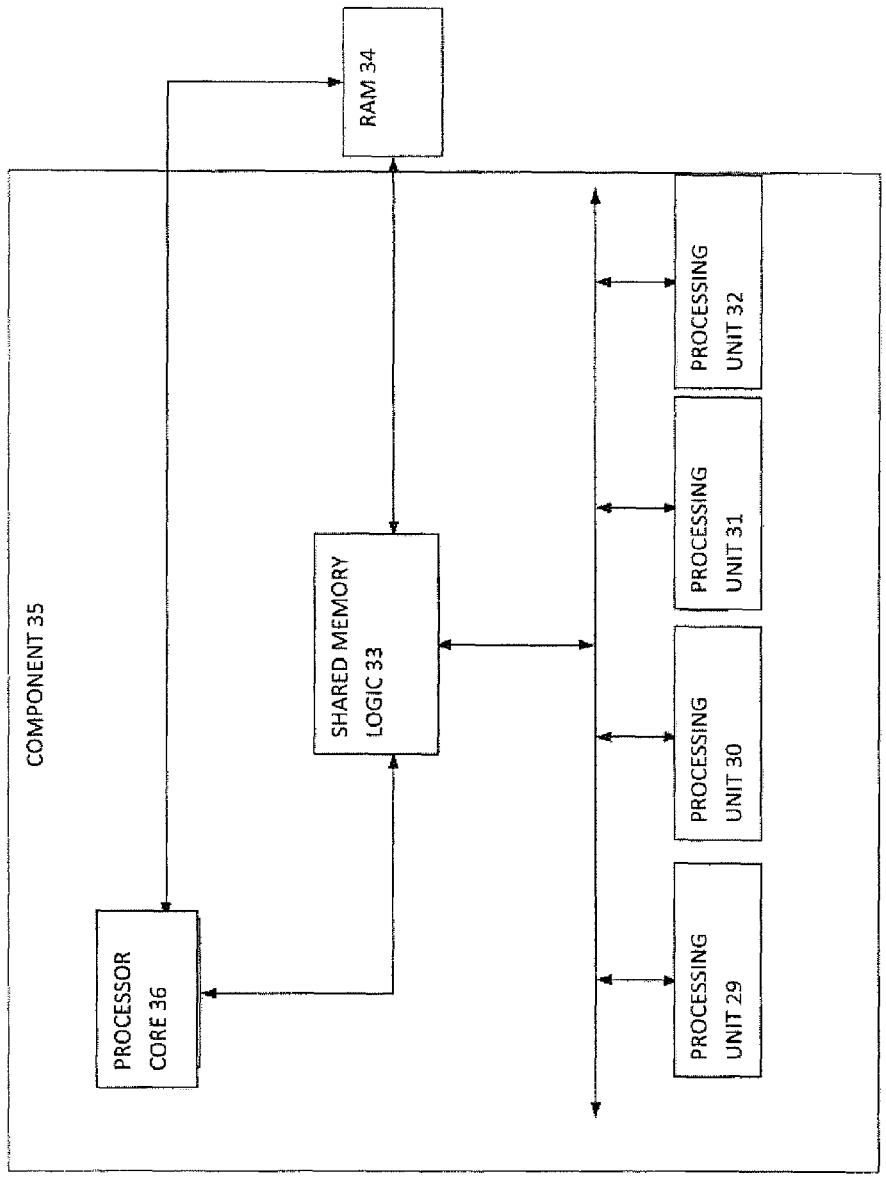
FIG. 3 is an illustration of a component in accordance with an aspect of this disclosure.

FIG. 3 is an illustration of a component in accordance with an aspect of this disclosure. In an aspect of this disclosure, component 35 may be configured to perform cryptographic operations. Component 35 may be one example of one implementation of cipher module 28 as shown in FIG. 2. Component 35 may be integrated into a variety of systems. For example, component 35 can be integrated within the die of a processor or found within a processor chipset. Component 35 can off-load a variety of cryptographic operations from other system processor(s). Component 35 may provide high performance at relatively modest clock speeds and is area efficient.

As shown, component 35 may be integrated on a single die that includes multiple processing units 29-32 coupled to shared memory logic 33. Shared memory logic 33 may include memory that can act as a staging area for data and control structures being operated on by the different processing units 29-32. For example, data may be stored in memory and then sent to different processing units 29-32 in turn, with each processing unit performing some task involved in cryptographic operations and returning the transformed data back to the shared memory logic 33.

In an aspect of this disclosure, processing units 29-32 may be constructed to perform different operations involved in cryptography such as encryption, decryption, authentication, and key generation. For example, processing unit 29 may perform hashing algorithms (e.g., MD5 (Message Digest 5) and/or SHA (Secure Hash Algorithm)) while processing unit 30 performs cipher operations (e.g., DES (Data Encryption Standard), 3DES (Triple DES), AES (Advanced Encryption Standard), RC4 (ARCFOUR), and/or Kasumi).

As shown, shared memory logic 33 is also coupled to RAM (random access memory) 34. In operation, data can be transferred from RAM 34 for processing by processing units 29-32. Potentially, transformed data (e.g., encrypted or decrypted data) is returned to RAM 34. Thus, RAM 34 may represent a nexus between component 35 and other system components (e.g., processor cores requesting cryptographic operations on data in RAM 34). RAM 34 may be external to the die hosting component 35.

The sample implementation shown includes processor core 36 that controls operation of component 35. As shown, the core 36 receives commands to perform cryptographic operations on data. Such commands can identify the requesting agent (e.g., core), a specific set of operations to perform (e.g., cryptographic protocol), the data to operate on (e.g., the location of a packet payload), and additional cryptographic context data such as a cryptographic key, initial vector, and/or residue from a previous cryptographic operation. In response to a command, processor core 36 can execute program instructions that transfer data between RAM 34, shared memory logic 33, and processing units 29-32.

Processor core 36 may be a multi-threaded processor core including storage for multiple program counters and contexts associated with multiple, respective, threads of program execution. Processor core 36 may switch between thread contexts to mask latency associated with processing unit 29-32 operation. Alternately, processor core 36 may use preemptive context switching that automatically switches contexts after certain events (e.g., requesting operation of a processing unit 29-32 or after a certain amount of execution time). Thread switching enables a different thread to perform other operations such as processing of a different packet in what would otherwise be wasted processor core 36 cycles. Throughput can be potentially be increased by adding additional contexts to processor core 36. In a multi-threaded implementation, threads can be assigned to commands in a variety of ways, for example, by a dispatcher thread that assigns threads to commands or by threads dequeuing commands when the threads are available.

The illustration of component 35 in FIG. 3 is not meant to imply physical or architectural limitations to the manner in which an aspect of this disclosure may be implemented. Other components in addition and/or in place of the ones illustrated may be used. Some components may be unnecessary in an aspect of this disclosure.

The different aspects of this disclosure recognize and take into account that 3GPP LTE (Long Term Evolution) has ambitious requirements for data rate, capacity, spectrum efficiency, and latency. At such high data rate, power consumption is becoming a critical factor of battery life.

Figure 4:
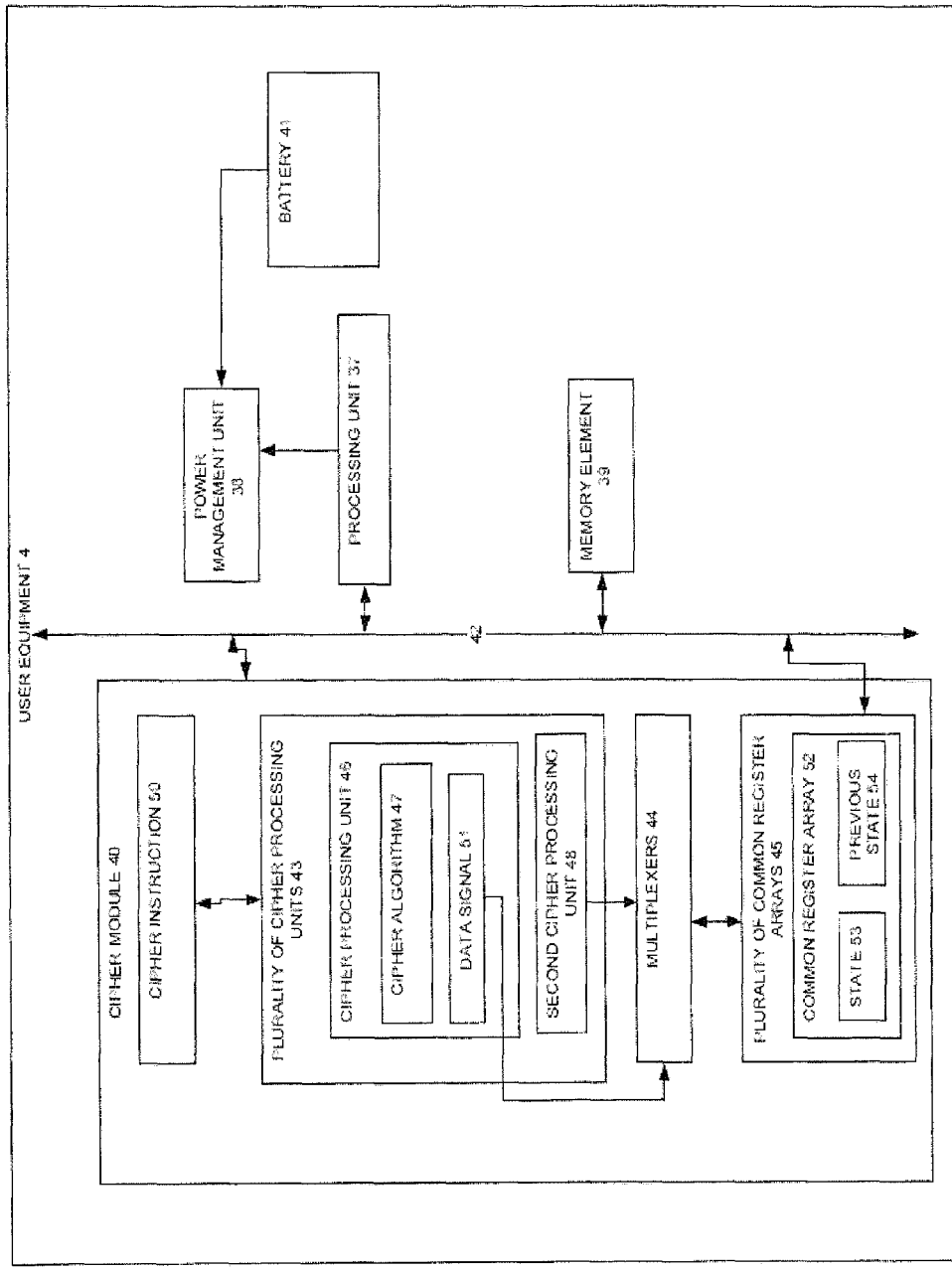
FIG. 4 is an illustration of user equipment in accordance with an aspect of this disclosure.

FIG. 4 is an illustration of user equipment in accordance with an aspect of this disclosure. In an aspect of this disclosure, user equipment 4 includes processing unit 37, memory element 39, power management unit 38, cipher module 40, and battery 41. These elements may be connected through bus 42.

In an aspect of this disclosure, processing unit 37 may be a processor, multi-core processor, single core process, micro controller, controller circuit, or any other type of processing device. Processing unit 37 may be one example of one implementation of processing unit 21 as shown in FIG. 2. A processing unit can execute any type of instructions associated with the data to achieve the operations detailed herein. In one aspect of this disclosure, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In an aspect of this disclosure, user equipment 4 may also include one or more memory elements (e.g., memory element 39) for storing information to be used in achieving operations associated with applications management, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory or storage items discussed herein should be construed as being encompassed within the broad term 'memory element' as used herein in this disclosure.

In an aspect of this disclosure, user equipment 4 may also include power management unit 38. Power management unit 38 may be one example of one implementation of power management unit 22 as shown in FIG. 2. Power management unit 38 manages the power for user equipment 4, for example including the appropriate voltage regulator and other functions, coupled to battery 41, an AC adaptor, DC adapter, or other types of power sources. Power management unit 38 may adjust power regulation throughout user equipment 4. Power management unit 38 may intelligently manage the use of power by the various functions within user equipment 4. Power management 38 may also control the power for plurality of cipher processing units 43 of cipher module 40.

In an aspect of this disclosure, user equipment 4 may also include cipher module 40. Cipher module 40 may include plurality of cipher processing units 43, multiplexers 44, and plurality of common register arrays 45. Cipher module 40 may be one example of one implementation of cipher module 28 as shown in FIG. 2. Cipher module may be connected to processing unit 37, memory element 39, and power management unit 38 through bus 42.

In an aspect of this disclosure, cipher module 40 may include plurality of cipher processing units 43. Plurality of cipher processing units 43 may be configured to utilize cipher algorithms in order to execute and process cipher instructions. Plurality of cipher processing units 43 may include cipher processing unit 46 and second cipher processing unit 48 as well as other cipher processing units.

In an aspect of this disclosure, cipher processing unit 46 may be able to use cipher algorithm 47 when executing cipher instruction 50. Cipher algorithm 47 may be a standard for encryption such as DES (Data Encryption Standard), 3DES (Triple DES), AES (Advanced Encryption Standard), RC4 (ARCFOUR), SNOW, Kasumi, and/or another type of data encryption standard. In an aspect of this disclosure, each cipher processing unit of plurality of cipher units 43 may utilize a different cipher algorithm. In other aspects of this disclosure, any combination of cipher algorithms may be used and some may be repeated within plurality of cipher processing units 43.

In an aspect of this disclosure, cipher instruction 50 may be an instruction to encrypt, decrypt, move, or in some manner manipulate data using cipher algorithm 47 or some other cipher algorithm. Cipher instruction 50 may be part of a data move (MOV) instruction.

In an aspect of this disclosure, cipher module 40 may include multiplexers 44. Multiplexers 44 are able to select data signal 51 from a number of data signals and forward data signal 51. As used herein, "a number of" may indicate one or more. For example, a number of data signals may be one or more data signals. For example, multiplexers 44 may select which cipher processing unit of plurality of cipher processing units 43 to use by forwarding the data signal from that particular cipher processing unit. Cipher instruction 50 may indicate how each multiplexer of multiplexers 44 may be configured to select the cipher processing unit that cipher instruction 44 indicates as selected. Multiplexers 44 may be configured through control signals.

In an aspect of this disclosure, cipher module 40 may include plurality of common register arrays 45. Plurality of common register arrays 44 may be register arrays utilized by plurality of cipher processing units 43 to carry out cipher instruction 50 or other cipher instructions. A register array may also be referred to herein as a register bank and/or flip-flops. A register array may be an amount of memory storage directly accessible by a processing unit (such as cipher processing unit 46) and accessed more quickly than memory element 39. A common register array, such as common register array 52, may be utilized by any of plurality of cipher processing units 43.

In an aspect of this disclosure, plurality of common register arrays 44 may be located separately from plurality of cipher processing units 43. In this context, "separate" means that the two elements may be connected by conductive paths (such as on a printed circuit board), but that the two elements are physically in different areas of the printed circuit board and the plurality of common register arrays 45 are not located within plurality of cipher processing units 43.

In an aspect of this disclosure, common register array 52 may be accessed by cipher processing unit 46 when multiplexers 44 have been configured to forward data signal 51 of cipher processing unit 46 to common register array 52. Multiplexers 44 may be configured to allow different cipher processing units to access plurality of common register arrays 45.

In an aspect of this disclosure, common register array 52 may have state 53. State 53 is the current state of the flip-flops and data structure of common register array 52. State 53 may be stored into memory element 39. A state that is loaded back into common register array 52 from memory element 39 may be a previously stored state, such as, for example, previous state 54.

The different aspects of this disclosure take into account that in current cipher processing systems, each cipher processing system includes a register array that only that cipher processing system may access. The aspects of this disclosure provide for common register arrays that may be accessed by any number of cipher processing units.

In an aspect of this disclosure, any cipher processing unit of plurality of cipher processing units 43 may have power restricted to it. For example, power management unit 38 may restrict power from battery 41 to whichever cipher processing units are inactive.

The illustration of user equipment 4 in FIG. 4 is not meant to imply physical or architectural limitations to the manner in which an aspect of this disclosure may be implemented. Other components in addition and/or in place of the ones illustrated may be used. Some components may be unnecessary in an aspect of this disclosure.

Figure 5:
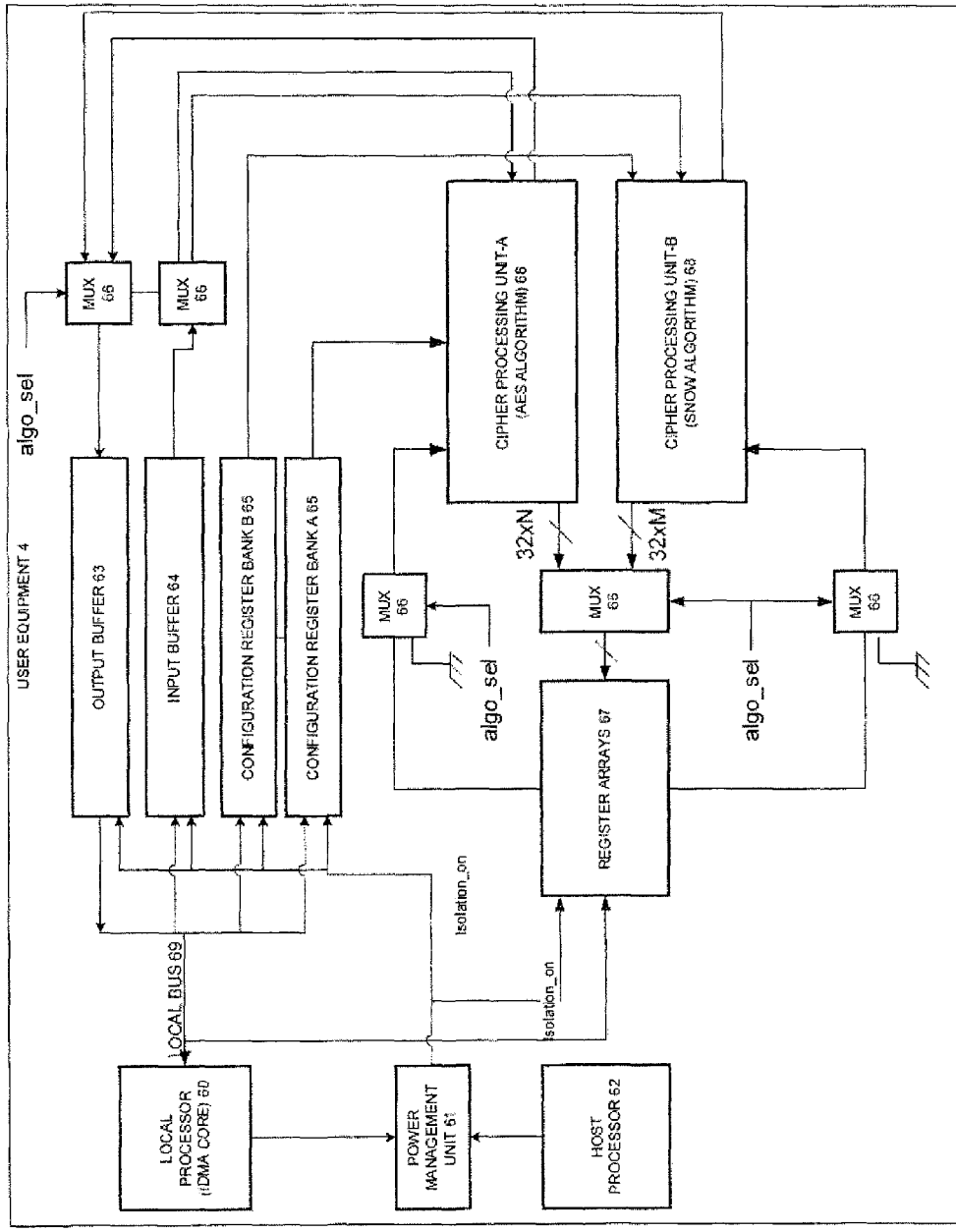
FIG. 5 is an illustration of user equipment in accordance with an aspect of this disclosure.

FIG. 5 is an illustration of user equipment in accordance with an aspect of this disclosure. In an aspect of this disclosure, user equipment 4 includes local processor 60, power management unit 61, host processor 62, output buffer 63, input buffer 64, configuration register banks 65, multiplexers 66, register arrays 67, and cipher processing units 68. These elements may be connected through bus 69.

In an aspect of this disclosure, local processor may be on example of one implementation of processing unit 37 as shown in FIG. 4. Power management unit 61 may be one example of one implementation of power management unit 38 as shown in FIG. 4.

In an aspect of this disclosure, host processor 62 may be the main processor of user equipment 4. Host processor 62 may be a processor, multi-core processor, single core process, micro controller, controller circuit, or any other type of processing device. A processing unit can execute any type of instructions associated with the data to achieve the operations detailed herein. In one aspect of this disclosure, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Host processor 62 may send data move or cipher instructions to local processor 60.

In an aspect of this disclosure, output buffer 63 and input buffer 64 may buffer the outgoing and incoming bit stream or data manipulated by cipher processing units 68. Multiplexers 66 may be used to select which cipher processing unit of cipher processing units 68 are being currently used. Multiplexers 66 are configured to forward a signal from cipher processing units to register arrays 67.

In an aspect of this disclosure, register banks 65 may be used to configure cipher processing units 68 in preparation of executing a cipher instruction. Register banks 65 may include a plurality of configurations.

The different aspects of this disclosure provide decupling flip flops and combinatorial logic cells as such using shared register banks amount multi-standard cryptography processing units since ciphering algorithms, like AES, Kasumi, SNOW, etc. are not running simultaneously, e.g. AES integrity algorithm and SNOW integrity algorithm are running concurrently, similar case in confidentiality encryption/decryption with AES, SNOW, Kasumi, etc. algorithms. All flip flops in cipher blocks can be pull out into shared common register banks, thus only combinatorial logic cells left in the cipher processing units. Note that register banks are arrays of flip-flops, thus each array is independently read/write accessible.

The different aspects of this disclosure may provide sharing flip-flop register banks By sharing flip-flop register banks (common register arrays), the different aspects of this disclosure may provide active power reduction. Unlike those instruction/operand based context switching, which may not maintain all of intermediate values including state of key generations, FSM (finite state machine), counter values, etc., a hot-swap context feature allows swapping various ciphering processes depending upon high/low priority of data packet and control frame in the wireless transmission protocol (latest 3GPP LTE releases included MIMO, multi-site, multi-stream downlink and uplink transmission). In this aspect, the system can put an on-going ciphering process hold at arbitrary points, and swap with a high priority channel. Upon completion of high priority task, the system then restores and resumes the on-hold ciphering task and it may not be necessary to restart entire sequences of cipher initialization, key generation, replay of up-to-stop point. Therefore, this aspect saves active power consumption.

The different aspects of this disclosure may provide sharing flip-flop register banks By sharing flip-flop register banks (common register arrays), the different aspects of this disclosure may make it easier to implement power down mode and retention mode (enabling isolation logic around register banks and reduce voltage level to the register banks) All flip-flops (common register arrays) in this aspect may be moved outside of the cipher blocks, implementing power isolation would be a simple step using the UPF/CPF design methodology. With this aspect, it may not be necessary to hand craft RTL for individual flip-flop or IO ports. Any inactive cipher blocks (combinatorial logic only) can be put into power down mode quickly but yet keep register banks alive.

The different aspects of this disclosure may provide sharing flip-flop register banks By sharing flip-flop register banks (common register arrays), the different aspects of this disclosure may provide static power consumption reduction. Static power consumption of flip-flop cells may be about 5.7 or 4.31 times of a NAND-2 logic in 65 nanometer and 40 nanometer process technologies, respectively. Sharing of all flip-flops may cut static power consumption proportionally. From an example cipher design, the area of flip-flops on the die may be about ¼ of the design. Using one of the aspects of this disclosure on such a cipher design may result in an estimated around 12.5% static power reduction.

The different aspects of this disclosure may provide sharing flip-flop register banks By sharing flip-flop register banks (common register arrays), the different aspects of this disclosure may provide gate count reduction. By sharing flip flops there may be around 2000 flops per tile saved in the cipher designs disclosed in one or more of the aspects of this disclosure. With 4 tiles in a cipher design, around 6000, with one common tile, flops may be reduced.

The different aspects of this disclosure may provide sharing flip-flop register banks By sharing flip-flop register banks (common register arrays), the different aspects of this disclosure may provide fast backup, restore, and resume operations. A back-door access to flip-flop register banks allows the host processor backing/restoring the state of a ciphering process in few cycles. For example, LTE Cipher units may share 1000 flip-flops between AES Integrity and SNOW Integrity. The processor only needs 32 cycles to backup the previous state, and can restore another operation in 32 cycles on a 32 bit local bus with sequential read/write accesses.

The different aspects of this disclosure may provide sharing flip-flop register banks By sharing flip-flop register banks (common register arrays), the different aspects of this disclosure may provide support for multi-thread features. Instead of single common register banks as shown in FIG. 5, some cipher designs implement eight common register banks to support multi-thread multi-standard ciphering in which allows on-the-fly context switching between 8 threads without backup and reinstall steps, such as in FIG. 4.

Figure 6:
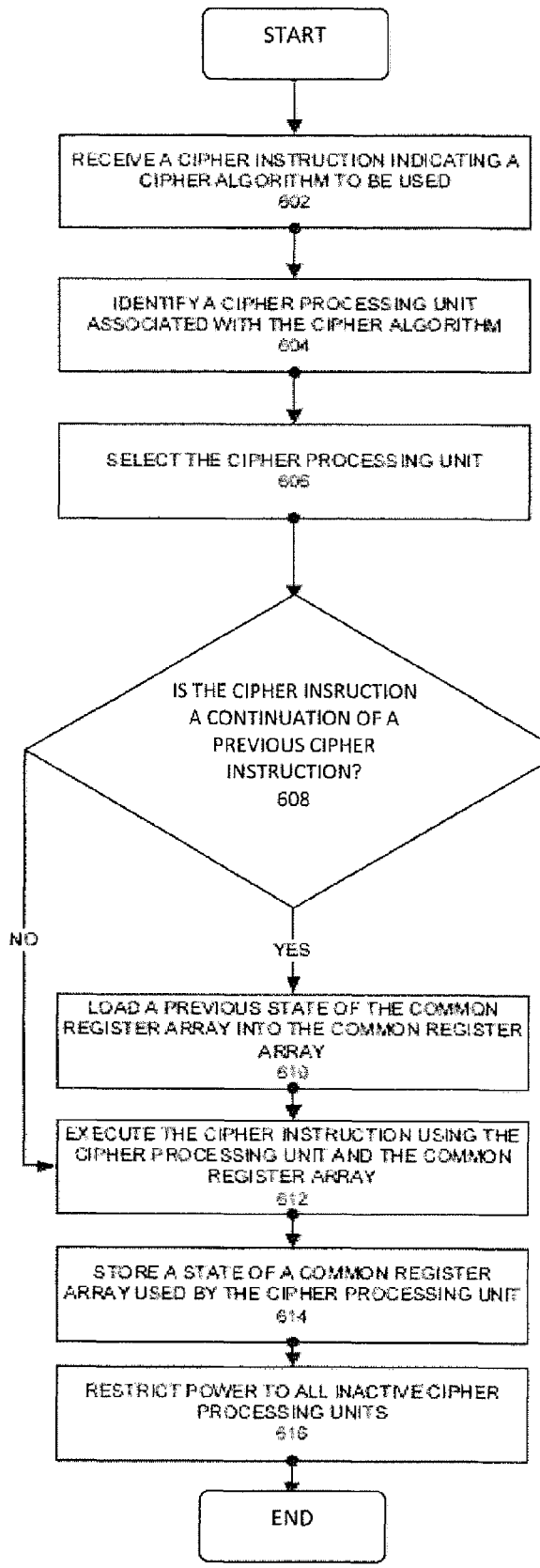
FIG. 6 is a flowchart for managing a plurality of cipher processor units in accordance with an aspect of this disclosure.

FIG. 6 is a flowchart for managing a plurality of cipher processor units in accordance with an aspect of this disclosure. Process 600 may be implemented in user equipment 4 of FIGS. 1-5.

In an aspect of this disclosure, process 600 begins with a cipher module receiving a cipher instruction indicating a cipher algorithm to be used (step 602). The cipher instruction may also indicate the length of the bit stream. Next, the cipher module identifies a cipher processing unit of the plurality of cipher processing units associated with the cipher algorithm (step 604). The cipher instruction may indicate that a certain cipher algorithm is to be used; one of the cipher processing units may be configured to implement this certain cipher algorithm.

Then, responsive to receiving a cipher instruction identifying the cipher processing unit, the cipher module selects the cipher processing unit (step 606). When the cipher module selects the cipher processing unit, the cipher module may configure at least one multiplexer to forward a data signal from the cipher processing unit to the common register bank. The multiplexer may be configured by a control signal (algorithm selection signal as indicated in FIG. 5). The cipher instruction may call for, for example, the cipher processing unit or a different and new cipher processing unit such as the second cipher processing unit.

Next, the cipher module determines whether the cipher instruction is a continuation of a previous cipher instruction (step 608). A previous cipher instruction may be a cipher instruction that was previously put on hold. If the cipher instruction was previously put on hold, then the state may be reloaded to continue the cipher instruction where it was put on hold. This enables the cipher module to skip parts of the cipher processing unit ramp up time.

Then, responsive to the cipher instruction being the continuation of the previous cipher instruction, the cipher module loads a previous state of the common register array into the common register array (step 610). The previous state may be the state of the common register array that was stored when the previous cipher instruction was previously put on hold. The state may have been stored in a memory element such as external memory or random access memory.

Next, the cipher module executes the cipher instruction using the cipher processing unit and the common register array (step 612). At step 608, if the cipher instruction was not a continuation of the previous cipher instruction, the process moves directly to step 612.

Then, the cipher module stores a state of a common register array used by the cipher processing unit of the plurality of cipher processing units (step 614). In an aspect of this disclosure, the cipher module may store the state in response to an ending of the executing of the cipher instruction. In other aspects of this disclosure, the cipher module may store the state at a predetermined time. The state of the common register array may be associated with the cipher processing unit of the plurality of cipher processing units. The state may later be recalled if the cipher instruction is continued. In an aspect of this disclosure, the cihper instruction may be continued with an updated or new configuration. In some aspects, the cipher instruction may be fully executed and storing the state of the common register array may not be necessary.

Also, the cipher processing unit may restrict power to all inactive cipher processing units (step 616). All inactive cipher processing units may be shut down to conserve battery power. Step 616 may occur in a different order in process 600. Thereafter, the process terminates. Once process 600 is finished, the process may be repeated. In a second iteration, a second cipher processing unit may be used. The second cipher processing unit may be the same as the cipher processing unit. The second cipher processing unit may be a different cipher processing unit. Essentially, after the cipher instruction has ended or been put on hold, a second cipher instruction may use the same or different cipher processing unit with a different cipher algorithm. However, whether or not the second cipher processing unit is the same as the cipher processing unit from the previous iteration, both may use the same common register array.

Additionally, in different aspects of this disclosure, the process may be used in other applications that would be beneficial to use a common register array, such as, for example, a serial bus data transfer.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In an aspect of this disclosure, a method may be provided for managing a plurality of processing units, the method comprising: receiving an instruction indicating an algorithm to be used; identifying a processing unit of the plurality of processing units associated with the algorithm; executing the instruction using the processing unit and a common register array; and storing a state of the common register array.

In an example of any aspects of this disclosure, the plurality of processing units are a plurality of cipher processing units, the instruction is a cipher instruction, and the algorithm is a cipher algorithm.

In an example of any aspects of this disclosure, a method further comprises determining whether the cipher instruction is a continuation of a previous cipher instruction, wherein the previous cipher instruction was previously put on hold; and responsive to the cipher instruction being the continuation of the previous cipher instruction, loading a previous state of the common register array into the common register array, wherein the previous state was stored when the previous cipher instruction was previously put on hold.

In an example of any aspects of this disclosure, a method further comprises restricting power to all inactive cipher processing units. Restricting power may be partially or completely. When partially, common register arrays can be in retention mode with lower voltage.

In an example of any aspects of this disclosure, a method further comprises, responsive to receiving a cipher instruction identifying the cipher processing unit, selecting the cipher processing unit.

In an example of any aspects of this disclosure, selecting the cipher processing unit comprises: configuring at least one multiplexer to forward a signal from the cipher processing unit to the common register bank.

In an example of any aspects of this disclosure, a method further comprises receiving a second cipher instruction indicating a second cipher algorithm to be used; identifying a second cipher processing unit of the plurality of cipher processing units associated with the cipher algorithm; executing the second cipher instruction using the second cipher processing unit and the common register array; and storing a second state of the common register array.

In an example of any aspects of this disclosure, the second cipher processing unit is the cipher processing unit in the plurality of cipher processing units.

In an example of any aspects of this disclosure, the second cipher processing unit is different from the cipher processing unit.

In an aspect of this disclosure, a system may be provided for performing cryptographic tasks, the system comprising: a memory unit; and a cipher module connected to the memory unit through the bus and configured to perform the cryptographic task, wherein the cipher module comprises: a plurality of cipher processing units configured to execute a cipher instruction; and a number of common register arrays associated with the plurality of cipher processing units, wherein each register array of the number of common register arrays is accessed by only one cipher processing unit at a time, and wherein a state of each of the number of common register arrays is configured to be stored into the memory unit by the cipher module.

In an example of any aspects of this disclosure, there are less register arrays than cipher processing units.

In an example of any aspects of this disclosure, power is restricted to any inactive cipher processing units of the plurality of cipher processing units.

In an example of any aspects of this disclosure, the cipher module is further configured to receive the cipher instruction indicating a cipher algorithm to be used.

In an example of any aspects of this disclosure, the cipher module is further configured to identify a cipher processing unit of the plurality of cipher processing units associated with the cipher algorithm.

In an example of any aspects of this disclosure, the cipher module is further configured to storing a state of the common register array accessed by the cipher processing unit.

In an aspect of this disclosure, an apparatus may be provided comprising: a bus; a memory unit; a number of common register arrays connected to the memory unit through the bus; and a plurality of cipher processing units connected to the number of common register arrays, wherein each of the plurality of cipher processing units is connected to each of the number of common register arrays, wherein the plurality of cipher processing units are separate from the number of common register arrays, and wherein each cipher processing unit is configured to execute a cipher instruction.

In an example of any aspects of this disclosure, each of the number of registry arrays is configured to be used by one of the plurality cipher processing units at a time.

In an example of any aspects of this disclosure, there are less register arrays than cipher processing units.

In an example of any aspects of this disclosure, the plurality of cipher processing units is separate from the number of register arrays.

What is claimed is:

1. A method for managing a plurality of processing units, the method comprising:
   receiving an instruction indicating an algorithm to be used;
   identifying a processing unit of the plurality of processing units associated with the algorithm;
   executing the instruction using the processing unit and a common register array; and
   storing a state of the common register array;
   wherein the plurality of processing units are a plurality of cipher processing units, the instruction is a cipher instruction, and the algorithm is a cipher algorithm; and
   receiving a second cipher instruction indicating a second cipher algorithm to be used;
   identifying a second cipher processing unit of the plurality of cipher processing units associated with the cipher algorithm;
   executing the second cipher instruction using the second cipher processing unit and the common register array; and
   storing a second state of the common register array;
   wherein the second cipher processing unit is the cipher processing unit in the plurality of cipher processing units.

2. The method of claim 1 further comprising:
   determining whether the cipher instruction is a continuation of a previous cipher instruction, wherein the previous cipher instruction was previously put on hold; and
   responsive to the cipher instruction being the continuation of the previous cipher instruction, loading a previous state of the common register array into the common register array, wherein the previous state was stored when the previous cipher instruction was previously put on hold.

3. The method of claim 1 further comprising:
   restricting power to all inactive cipher processing units.

4. The method of claim 1 further comprising:
   responsive to receiving a cipher instruction identifying the cipher processing unit, selecting the cipher processing unit.

5. The method of claim 4, wherein selecting the cipher processing unit comprises:
   configuring at least one multiplexer to forward a signal from the cipher processing unit to the common register array.

6. The method of claim 1, wherein the second cipher processing unit is different from the cipher processing unit.

7. A system for performing cryptographic tasks, the system comprising:
   a memory unit; and
   a cipher module connected to the memory unit through a bus and configured to perform the cryptographic task, wherein the cipher module comprises:
     a plurality of cipher processing units configured to execute a cipher instruction; and
     a number of common register arrays associated with the plurality of cipher processing units, wherein each register array of the number of common register arrays is accessed by only one cipher processing unit at a time, and wherein a state of each of the number of common register arrays is configured to be stored into the memory unit by the cipher module;
   wherein the system is configured to
     receive a first cipher instruction indicating a first cipher algorithm to be used;
     identify a first cipher processing unit of the plurality of cipher processing units associated with the first cipher algorithm;
     execute the first cipher instruction using the first cipher processing unit and the common register array;
     store a state of the common register array;

receive a second cipher instruction indicating a second cipher algorithm to be used;

identify a second cipher processing unit of the plurality of cipher processing units associated with the second cipher algorithm;

execute the second cipher instruction using the second cipher processing unit and the common register array; and store a second state of the common register array;

wherein the second cipher processing unit is the first cipher processing unit in the plurality of cipher processing units.

8. The system of claim 7, comprising less register arrays than cipher processing units.

9. The system of claim 7, wherein power is restricted to any inactive cipher processing units of the plurality of cipher processing units.

10. The system of claim 7, wherein the cipher module is further configured to receive the cipher instruction indicating a cipher algorithm to be used.

11. The system of claim 10, wherein the cipher module is further configured to identify a cipher processing unit of the plurality of cipher processing units associated with the cipher algorithm.

12. The system of claim 7, wherein the cipher module is further configured to storing a state of the common register array accessed by the cipher processing unit.

13. An apparatus comprising:

a bus;

a memory unit;

a number of common register arrays connected to the memory unit through the bus; and a plurality of cipher processing units connected to the number of common register arrays, wherein a state of each of the number of common register arrays is configured to be stored into the memory unit, wherein each of the plurality of cipher processing units is connected to each of the number of common register arrays, wherein the plurality of cipher processing units are separate from the number of common register arrays, and wherein each cipher processing unit is configured to execute a cipher instruction, wherein the apparatus is configured to receive a first cipher instruction indicating a first cipher algorithm to be used;

identify a first cipher processing unit of the plurality of cipher processing units associated with the first cipher algorithm;

execute the first cipher instruction using the first cipher processing unit and the common register array;

store a state of the common register array;

receive a second cipher instruction indicating a second cipher algorithm to be used;

identify a second cipher processing unit of the plurality of cipher processing units associated with the second cipher algorithm;

execute the second cipher instruction using the second cipher processing unit and the common register array; and store a second state of the common register array;

wherein the second cipher processing unit is the first cipher processing unit in the plurality of cipher processing units.

14. The apparatus of claim 13, wherein each of the number of registry arrays is configured to be used by one of the plurality cipher processing units at a time.

15. The apparatus of claim 13, comprising less register arrays than cipher processing units.

16. The apparatus of claim 13, wherein the plurality of cipher processing units is separate from the number of common register arrays.

* * * * *